United States Patent [19]

Yatka

[11] Patent Number: 5,334,396
[45] Date of Patent: Aug. 2, 1994

[54] CHEWING GUM SWEETENED WITH ALITAME AND HAVING A HIGH LEVEL OF LECITHIN

[75] Inventor: Robert J. Yatka, Orland Park, Ill.

[73] Assignee: Wm. Wrigley Jr. Company, Chicago, Ill.

[21] Appl. No.: 963,897

[22] Filed: Oct. 19, 1992

[51] Int. Cl.$^5$ .............................................. A23G 3/30
[52] U.S. Cl. ..................................... 426/3; 426/548; 426/662
[58] Field of Search ...................... 426/3–6, 426/548, 804, 662

[56] References Cited

U.S. PATENT DOCUMENTS

| | | | |
|---|---|---|---|
| 4,411,925 | 10/1983 | Brennan et al. | 426/548 |
| 4,517,379 | 5/1985 | Brennan et al. | 426/548 |
| 4,536,396 | 8/1985 | Stephens, Jr. et al. | 426/3 |
| 4,604,288 | 8/1986 | Glass et al. | 426/5 |
| 4,752,481 | 6/1988 | Dokuzovic | 426/3 |
| 4,786,491 | 11/1988 | Patel | 426/3 |
| 4,816,265 | 3/1989 | Cherukuri et al. | 426/5 |
| 4,904,482 | 2/1990 | Patel et al. | 426/3 |
| 4,997,659 | 3/1991 | Yatka et al. | 426/3 |
| 5,034,231 | 7/1991 | Yatka et al. | 426/3 |
| 5,039,530 | 8/1991 | Yatka et al. | 426/3 |
| 5,041,293 | 8/1991 | Patel et al. | 426/3 |
| 5,057,327 | 10/1991 | Yatka et al. | 426/3 |
| 5,064,658 | 11/1991 | Cherukuri et al. | 426/3 |
| 5,094,858 | 3/1992 | Yatka et al. | 426/5 |
| 5,110,608 | 5/1992 | Cherukuri et al. | 426/3 |
| 5,126,151 | 6/1992 | Bodor et al. | 426/99 |
| 5,135,761 | 8/1992 | Dave et al. | 426/5 |
| 5,145,708 | 9/1992 | Patel et al. | 426/3 |

FOREIGN PATENT DOCUMENTS

| | | |
|---|---|---|
| 0354680 | 2/1990 | European Pat. Off. . |
| 0398466 | 11/1990 | European Pat. Off. . |
| 0420539A2 | 4/1991 | European Pat. Off. . |
| 0458750A1 | 11/1991 | European Pat. Off. . |
| 90/04926 | 5/1990 | PCT Int'l Appl. . |
| 90/06061 | 6/1990 | PCT Int'l Appl. . |

OTHER PUBLICATIONS

Report entitled "Alitame-A New High-Intensity Sweetener-Technical Summary, 1987" by Pfizer.
Nancy M. Meinhold, "Lecithin Development & Applications", *Food Processing*, May 1991, pp. 130–134.
Advertising brochure entitled "Lecithin in Chewing Gum", 1990, Central Soya Company, Inc.
Booklet entitled "The Industrial Lecithin Book, a guide to lecithin from Central Soya", 1990, Central Soya Company, Inc.

*Primary Examiner*—Jeanette Hunter
*Attorney, Agent, or Firm*—Willian Brinks Hofer Gilson & Lione

[57] ABSTRACT

Chewing gum containing Alitame and a high level of lecithin has surprisingly been found to provide chewing gum with a delayed release of the Alitame. The gum composition includes about 5% to about 95% gum base, about 10% to about 90% bulking agent, a sweetening amount of Alitame, and lecithin in an amount effective to delay the release of the Alitame such that at least a 15% decrease in Alitame release rate is achieved compared to the release rate of the same formula without lecithin.

19 Claims, 10 Drawing Sheets

CHEWING GUM SWEETENED WITH ALITAME AND HAVING A HIGH LEVEL OF LECITHIN

BACKGROUND OF THE INVENTION

The present invention relates to chewing gum compositions and methods for producing chewing gum. More particularly, the invention relates to producing chewing gum containing Alitame, a high-potency sweetener, wherein the gum formulation is adapted to delay the release of the Alitame.

In recent years, efforts have been devoted to controlling release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum.

One such high-potency sweetener is Alitame (L-α-Aspartyl-N-(2,2,4,4-tetramethyl-3-thietanyl)-D-alaninamide hydrate). This sweetener, which is not yet approved for use in food products and chewing gum, is being considered by the FDA as a food additive. The manufacturer of Alitame is the Pfizer Corporation of Groton, Conn. This highly consumer-acceptable, high-potency sweetener gives chewing gum a fast, strong release that is not desirable. Methods of delaying the release of sweetness in balance with the chewing gum flavor would therefore be a definite improvement.

Use of Alitame in chewing gum has been disclosed in several patents. U.S. Pat. No. 4,411,925 discloses simple addition of Alitame in gum. U.S. Pat. No. 4,536,396 discloses combinations of Alitame and Acesulfame K in foods including chewing gum.

PCT Publication WO 90/06061 discloses a number of techniques for treating Alitame to modify its release from chewing gum.

Several patents have disclosed methods of improving the stability of Alitame, such as U.S. Pat. Nos. 5,034,231; 5,039,530 and 5,094,858 to Yatka et al.

U.S. Pat. No. 5,057,327 to Yatka et al. discloses chewing gum with an extended sweetness and flavor intensity using Alitame.

It would be considered a significant improvement to a chewing gum to have the Alitame sweetener release its sweetness as the flavor in the gum is released, thus balancing the overall taste perception, without having to first modify the Alitame. Since the normal sweetness release in gum occurs primarily during the first few minutes of chewing, it would be most beneficial if the sweetness release during the first six minutes of chewing could be delayed.

SUMMARY OF INVENTION

The present invention includes a gum composition and method for producing chewing gum with Alitame and a high level of lecithin, surprisingly found to delay the release of the Alitame.

In one aspect the invention is a chewing gum composition comprising about 5% to about 95% gum base, about 10% to about 90% bulking agent, a sweetening amount of Alitame and lecithin in amount effective to delay the release of the Alitame, whereby at least a 15% decrease in the Alitame release rate between the first and sixth minutes of chewing, compared to the same formula without the lecithin, is achieved.

In another aspect the invention is a chewing gum composition comprising about 5% to about 95% gum base, about 10% to about 90% bulking agent, a formulated amount of Alitame, and lecithin in an amount effective such that after six minutes of chewing, at least 25% of the original amount of Alitame has yet to be released from the gum.

In another aspect the invention is a process for delaying the release of Alitame from a gum composition comprising formulating a gum composition comprising from about 5% to about 95% gum base, about 10% to about 90% bulking agent and a sweetening amount of Alitame and admixing into the gum composition at least about 0.4% lecithin.

In another aspect the invention is a process for making a chewing gum composition having a delayed release of Alitame sweetener comprising the steps of:

a) providing a gum base at a level of about 5% to about 95% of the gum composition, b) providing a bulking agent at a level of about 10% to about 90% of the gum composition, c) providing an Alitame sweetening agent at a level of about 0.01% to about 0.2% of the gum composition, d) providing lecithin at a level of at least about 0.4% of the gum composition, and e) mixing the gum base, bulking agent, Alitame sweetening agent and lecithin to make a chewing gum composition.

The present invention gives a chewing gum having a delayed-release Alitame. A higher quantity of the sweetener can be used without resulting in a high initial sweetness impact, but instead having a delayed sweetness release that is compatible with the delayed flavor release in chewing gum, giving a highly consumer-acceptable chewing gum product. This result is unexpected because one would normally expect higher lecithin levels to have no effect on the release of water soluble gum ingredients such as Alitame.

DETAILED DESCRIPTION OF THE DRAWINGS AND PREFERRED EMBODIMENTS OF THE INVENTION

Figure 1:
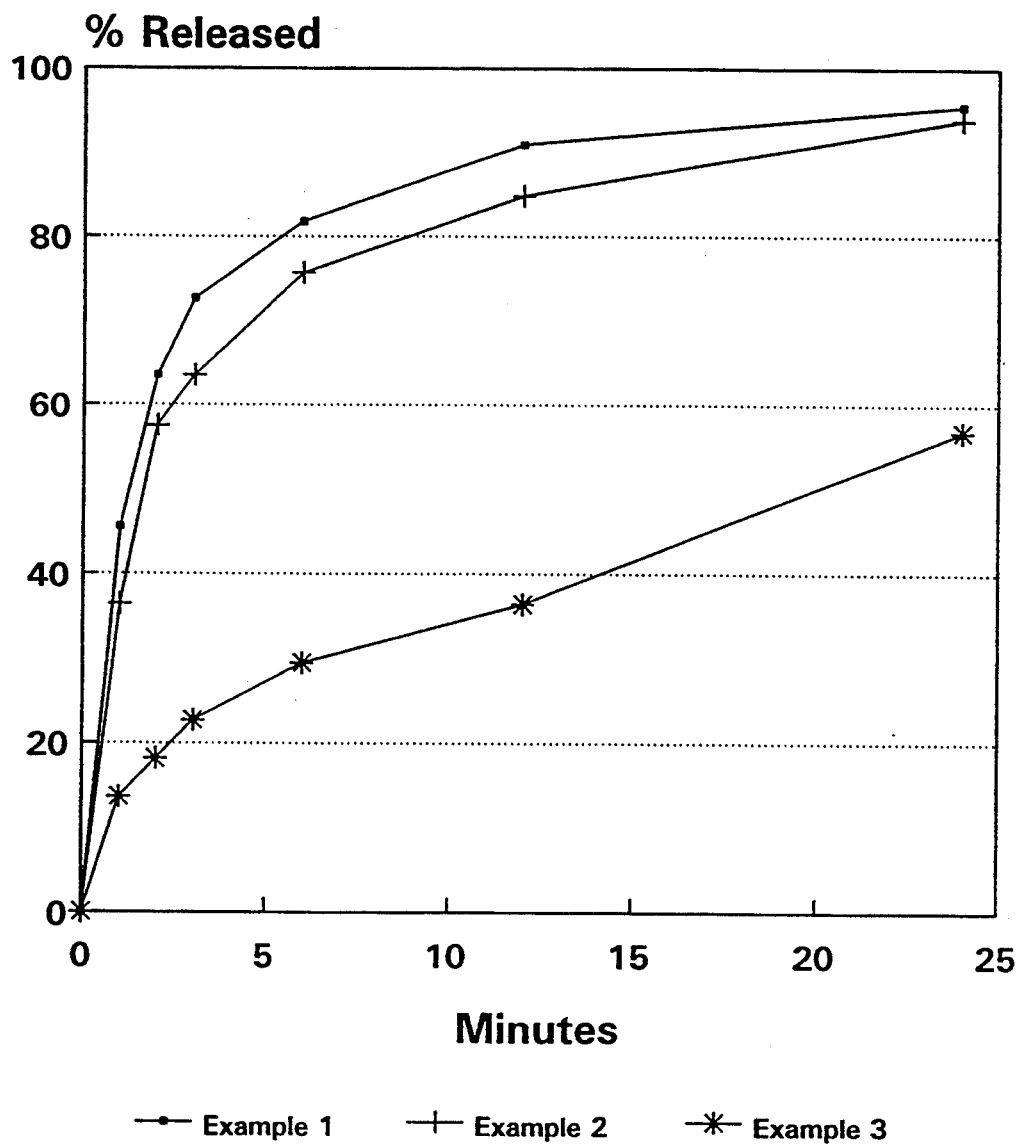
FIG. 1 is a graph showing the Alitame release rates of the gum formulations made in comparative Examples 1 and 2 and Example 3.

Alitame (L-α-Aspartyl-N-(2,2,4,4-tetramethyl-3-thietanyl)-D-alaninamide hydrate) is a new, high-potency sweetener which is about 2000 times sweeter than sugar. The taste properties of Alitame are considered good. At concentrations usually used, Alitame has a pure and rapidly perceptible sweet taste that does not linger.

When Alitame is added to chewing gum at a level of about 0.01%-0.05%, the sweetener gives chewing gum a fast, intense sweetness that dissipates quickly, leaving a strong flavor character that is less pleasant. Previous tests of Alitame showed that the same fast, intense sweetness results from chewing gum whether the Alitame was added as a fine powder or dissolved in water, glycerin, propylene glycol, corn syrup, hydrogenated starch hydrolyzate or other compatible aqueous solution.

Usage levels of Alitame in water or an aqueous solvent is limited to its solubility in the aqueous solvent. The solubility of Alitame in water is approximately 13 g/100 ml at its isoelectric point and 25° C., and increases to 30 g/100 ml at 50° C. At both high and low pHs, Alitame has solubilities up to 50% at 50° C. In solvents like ethanol or propylene glycol, the solubility of Alitame is very high.

As stated previously, Alitame releases very quickly from chewing gum during the early stages of mastication of the gum because of its high solubility in water. Earlier efforts to delay the Alitame release rate involved physical modifications of the sweetener by encapsulation with another substrate to slow its release. The Alitame was thus released more slowly from chewing gum because the solubility or dissolution rate of Alitame was reduced.

Lecithin is nature's most active surfactant, and one of the most versatile. It can release, disperse, lubricate, and control product viscosity and crystallization. It can act as a softening agent or wetting agent, an emollient, and antioxidant. It has been used in a variety of food products like bakery foods, dairy foods, instantized mixes and confections. It is commonly used in a variety of sugar candies like taffy, caramel, chocolate and chewing gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fulfill the role of bulking agents. However, bulking agents may include other, non-sweetening filler materials. The bulking agents generally comprise from about 10 to about 90% of the gum composition, and more preferably about 30% to about 60% of the composition.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated for use in the present invention include glycerin. Further, aqueous sweetener solutions such as those containing sorbitol, hydrogenated starch hydrolysates, corn syrup and combinations thereof may be used as softeners and binding agents in gum.

The present invention will most likely be used in sugarless gum formulations. However, formulations containing sugar are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The Alitame used in the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the Alitame used in the present invention can also be used in combination with other high-potency sweeteners, either coated or uncoated.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color and emulsifiers may also be added at this time. A softener such as glycerin may also be added at this time, along with syrup and a portion of the bulking agent. Further portions of the bulking agent may then be added to the mixer. The Alitame is preferably added also at this time. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

During preliminary screening tests of gum compositions sweetened with Alitame, powdered Alitame was added to a variety of types of chewing gum formulations and tested for release rate by "chewout" tests. It was determined that for some unknown reason, bubble gum type formulations gave a very slow release of Alitame compared to other gum formulas like spearmint and peppermint flavored chewing gum. Three of the gum formulations used in these screening tests are listed below as Examples 1-3.

|  | Comparative Example 1 | Comparative Example 2 | Example 3 |
|---|---|---|---|
| Conventional Base | 24.0 | 25.5 | — |
| Bubble Gum Base | — | — | 32.5 |
| Lecithin | 0.13 | 0.21 | 1.5 |
| Sorbitol | 50.0 | 49.4 | 46.65 |
| Mannitol | 7.3 | 8.0 | 7.0 |
| Glycerin | 8.0 | 6.3 | 9.0 |
| Coevaporated Glycerin/Lycasin* | 9.2 | 9.1 | — |
| Color | 0.03 | 0.05 | 0.15 |
| Spearmint Flavor | 1.34 | — | — |
| Peppermint Flavor | — | 1.44 | — |
| Bubble Gum Flavor | — | — | 1.67 |
| Fumaric Acid | — | — | 0.6 |
| Citric Acid | — | — | 0.55 |
| Adipic Acid | — | — | 0.38 |

*The coevaporated glycerin and Lycasin used in these examples and each of the following examples contained approximately 25% glycerin, 7.5% water and 67.5% hydrogenated starch hydrolysates. Lycasin is a trademark of Roquette Corporation.

Alitame was added to these formulas at a level of 0.02% for Example 1, 0.03% for Example 2 and 0.04% for Example 3. The gum samples were formed into approximately one gram pieces and used for the "chewout" tests. Before the test, each gum piece sample was weighed. The "chewout" test next consisted of six individuals each chewing two pieces of gum for 0.5, 1, 2, 3, 6, 12 and 24 minutes. For example, six individuals were each given two pieces of gum and requested to chew the gum for 0.5 minutes. The bolus were then removed and combined in a 4 oz. bottle. The same six individuals then chewed two more gum pieces for one minute, and the bolus were combined in another 4 oz. bottle. In the same manner, more bolus were obtained for 2, 3, 6, 12 and 24 minutes of chewing.

The percent Alitame in unchewed sample gum pieces, and in the samples after chewing, was determined by liquid chromatography based on the weight prior to chewing. The percent remaining was then calculated by:

$$\% \text{ remaining} = \frac{\% \text{ Alitame at Time } (T)}{\% \text{ of Alitame Initially } (T_o)} \times 100$$

and % released = 100 − % remaining

Based on the Alitame-remaining analysis calculated as above, the release data for Examples 1-3 are shown in FIG. 1. It is evident that the release rate of Alitame in Examples 1 and 2 was much faster than the release rate of Example 3. Examples 1 and 2 have therefore been labeled at Comparative Examples.

The gum formulas for Examples 1-3 were scrutinized to see what might have caused the difference in release rates. The differences in the formulas for Examples 1-3 were 1) the types and quantity of base, 2) the various acids, 3) the types of flavors, 4) the amount of lecithin emulsifier and 5) the amount of Alitame. A series of gum formulations without acids and with different flavors were tested and these factors were found to have little effect on the Alitame release rate. It thus appeared that the base and/or lecithin had the slow release effect.

More tests with gum formulations having various types of bases and base at various levels were tried to determine their effect on the release rate. Chewing gums of the following Examples 4 and 5 with bubble gum base were made. Four samples (A-D) at different base levels were made for each of Example 4 and Example 5.

|  | Comparative Example 4 | | | | Example 5 | | | |
|---|---|---|---|---|---|---|---|---|
|  | A | B | C | D | A | B | C | D |
| Bubble Gum Base | 32.5 | 25.5 | 21.0 | 28.0 | 32.5 | 25.5 | 21.0 | 28.0 |
| Sorbitol | 42.4 | 49.4 | 53.9 | 46.9 | 41.1 | 48.1 | 52.6 | 45.6 |
| Mannitol | 8.0 | 8.0 | 8.0 | 8.0 | 8.0 | 8.0 | 8.0 | 8.0 |
| Coevaporated Glycerin/ | 9.1 | 9.1 | 9.1 | 9.1 | 9.11 | 9.11 | 9.11 | 9.11 |

-continued

|  | Comparative Example 4 | | | | Example 5 | | | |
| --- | --- | --- | --- | --- | --- | --- | --- | --- |
|  | A | B | C | D | A | B | C | D |
| Lycasin |  |  |  |  |  |  |  |  |
| Glycerin | 6.3 | 6.3 | 6.3 | 6.3 | 6.3 | 6.3 | 6.3 | 6.3 |
| Peppermint Flavor | 1.45 | 1.45 | 1.45 | 1.45 | 1.45 | 1.45 | 1.45 | 1.45 |
| Alitame | 0.04 | 0.04 | 0.04 | 0.04 | 0.04 | 0.04 | 0.04 | 0.04 |
| Lecithin | 0.21 | 0.21 | 0.21 | 0.21 | 1.5 | 1.5 | 1.5 | 1.5 |

Each sample was tested and analyzed by the chewout test as described for Examples 1–3, except gum was chewed for 1, 3, 6, and 18 minutes. The percentage release results are shown in Table 1 below. The time column zero lists the analytical Alitame composition of the gum sample before chewing. The other columns show the percentage of Alitame released.

TABLE 1

|  | Time, Minutes | | | | |
| --- | --- | --- | --- | --- | --- |
|  | 0 | 1 | 3 | 6 | 18 |
| Example 4A | 0.041 | 46.3 | 65.9 | 75.6 | 95.1 |
| Example 4B | 0.048 | 66.7 | 81.3 | 83.3 | 95.8 |
| Example 4C | 0.040 | 62.5 | 85.0 | 87.5 | 95.0 |
| Example 4D | 0.039 | 61.5 | 74.4 | 84.6 | 94.9 |
| Example 4 (Average) |  | 59.2 | 76.6 | 82.8 | 95.2 |
| Example 5A | 0.026 | 7.7 | 26.9 | 34.6 | 76.9 |
| Example 5B | 0.037 | 48.7 | 54.0 | 56.8 | 75.7 |
| Example 5C | 0.040 | 55.0 | 65.0 | 67.5 | 80.0 |
| Example 5D | 0.030 | 30.0 | 40.0 | 43.3 | 66.7 |
| Example 5 (Average) |  | 35.4 | 46.5 | 50.6 | 74.8 |

Figure 2:
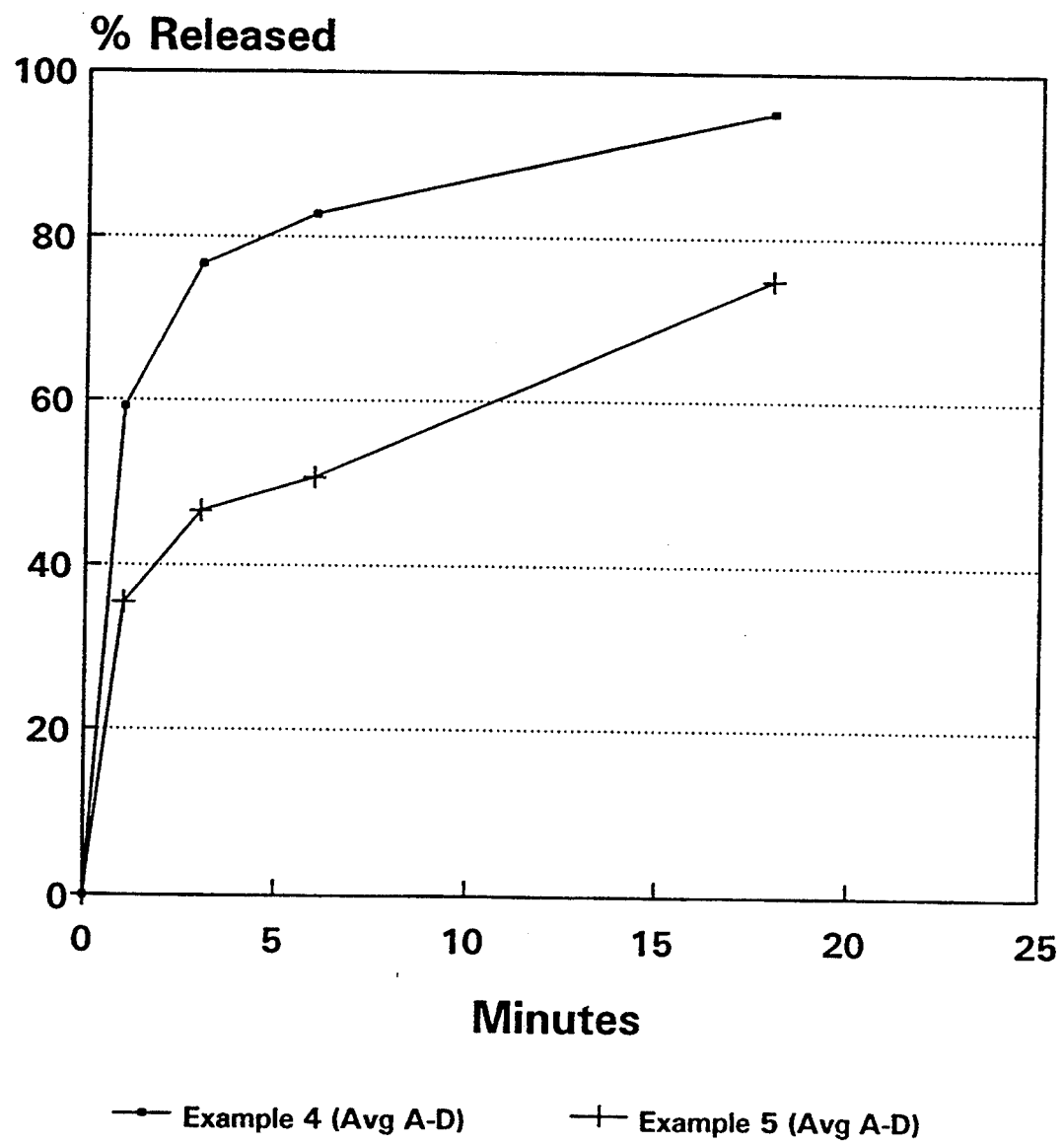
FIG. 2 is a graph showing the average of the Alitame release rates of the gum formulations in Examples 4A–4D and Examples 5A–5D, both bubble gum formulations.

Averages for the data from the four samples of Example 4 and the four samples of Example 5 were calculated and graphed in FIG. 2. The results show that bubble gum made with a high level of lecithin gave a much slower release rate of Alitame than bubble gum made with a lower level of lecithin. Example 4 has thus been labeled a Comparative Example.

Chewing gums of the following Examples 6–9 with conventional gum base were made and tested as described for Examples 1–3.

|  | Comparative Ex. 6 | Ex. 7 | Ex. 8 | Ex. 9 |
| --- | --- | --- | --- | --- |
| Conventional Base | 25.5 | 25.5 | 25.5 | 25.5 |
| Sorbitol | 49.6 | 49.2 | 48.8 | 48.0 |
| Lecithin | — | 0.4 | 0.8 | 1.6 |
| Mannitol | 8.0 | 8.0 | 8.0 | 8.0 |
| Glycerin | 6.3 | 6.3 | 6.3 | 6.3 |
| Coevaporated Glycerin/Lycasin | 9.11 | 9.11 | 9.11 | 9.11 |
| Peppermint Flavor | 1.45 | 1.45 | 1.45 | 1.45 |
| Alitame | 0.04 | 0.04 | 0.04 | 0.04 |

Figure 3:
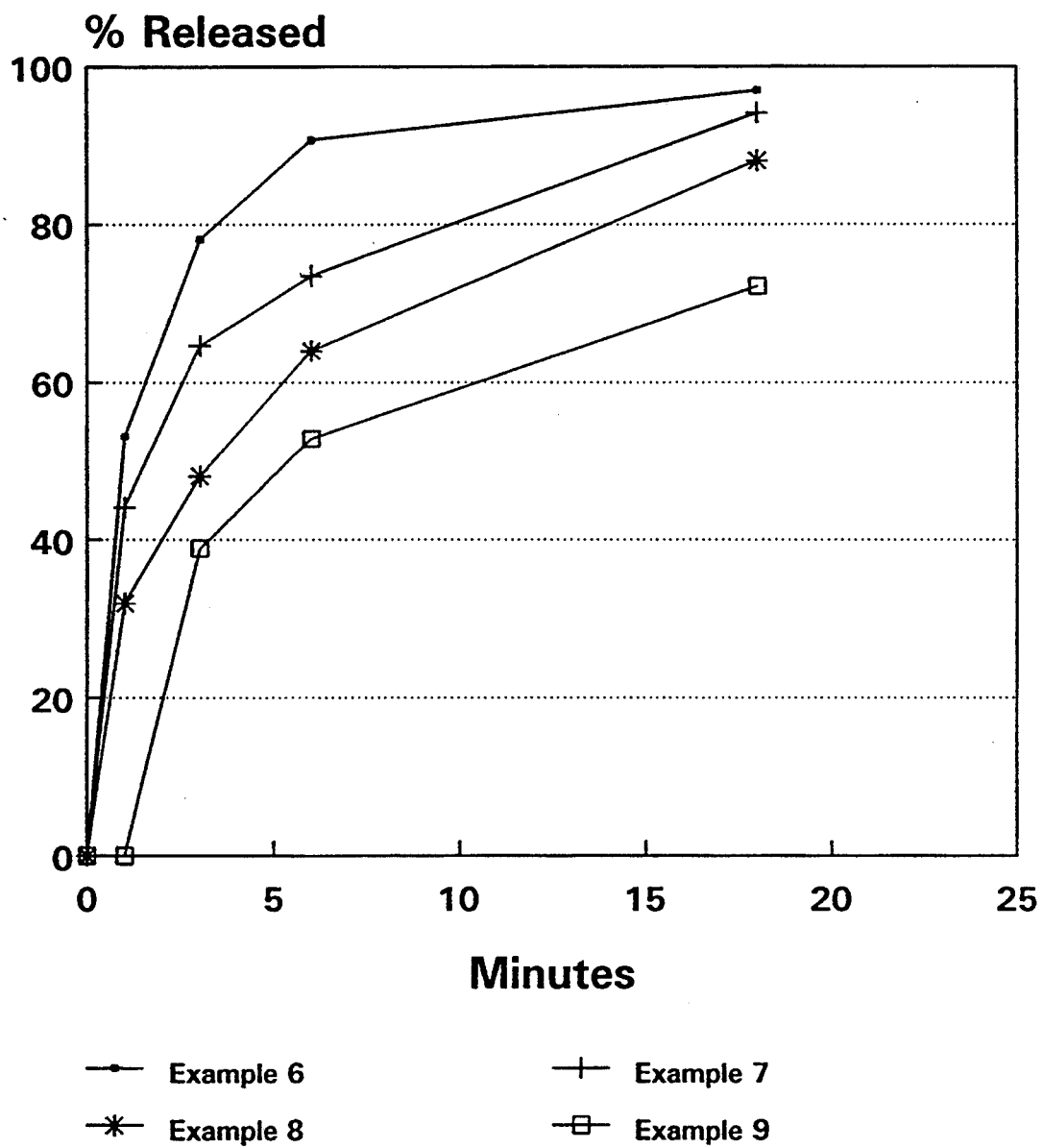
FIG. 3 is a graph showing the Alitame release rates of the gum formulations in comparative Example 6 and Examples 7 through 9.

The four examples were tested in chewout tests at 1, 3, 6 and 18 minutes and the percent released data is given in Table 2 below and shown in FIG. 3. Again, the time-zero column lists the analytical Alitame compositions of the gum sample before chewing.

TABLE 2

|  | Time, Minutes | | | | |
| --- | --- | --- | --- | --- | --- |
|  | 0 | 1 | 3 | 6 | 18 |
| Example 6 | 0.032 | 53.1 | 78.1 | 90.6 | 97.0 |
| Example 7 | 0.034 | 44.1 | 64.7 | 73.5 | 94.1 |
| Example 8 | 0.025 | 32.0 | 48.0 | 64.0 | 88.0 |
| Example 9 | 0.032 | 0.0 | 38.9 | 52.8 | 72.2 |

The results show that as the level of lecithin is increased, the release of Alitame is delayed. At 0.4% lecithin, a slight delay is noted, and at higher levels, the delay becomes longer. Since Comparative Example 6 had no emulsifier, and since Examples 6–8 otherwise used the same gum formula, the difference in release rates caused by the emulsifier can be calculated by considering the difference in release rates between Comparative Example 6 and each of Examples 7, 8 and 9. Those differences, and the percentage decrease in the release rate (difference divided by the release rate for Comparative Example 6) are tabulated in Tables 3 and 4 below.

TABLE 3

| Differences in Release Rate Compared to Comparative Example 6 | | | | |
| --- | --- | --- | --- | --- |
|  | Time, Minutes | | | |
|  | 1 | 3 | 6 | 18 |
| Example 7 | 9.0 | 13.4 | 17.1 | 2.9 |
| Example 8 | 21.1 | 30.1 | 26.6 | 9.0 |
| Example 9 | 53.1 | 39.2 | 37.8 | 24.8 |

TABLE 4

| Percentage Decrease in Release Rate Compared to Comparative Example 6 | | | | |
| --- | --- | --- | --- | --- |
|  | Time, Minutes | | | |
|  | 1 | 3 | 6 | 18 |
| Example 7 | 16.9 | 17.4 | 18.9 | 3.0 |
| Example 8 | 39.7 | 38.5 | 29.4 | 9.3 |
| Example 9 | 100.0 | 50.2 | 41.7 | 25.6 |

As can be seen from Table 4, the use of 0.4 lecithin in Example 7 was effective to delay the release of the Alitame by over 15% during the first through sixth minutes of chewing, compared to the same formula without the emulsifier.

Based on previous results, there was still some concern that the base level may have an effect on the release rate of Alitame. As a result, sixteen gum formulas were tested using four different base levels (20%, 24%, 28% and 32%) and four different levels of lecithin (0.0%, 0.2%, 0.75% and 1.5%). Examples 10–13 below show the formulations.

|  | Comparative Ex. 10 | | | | Comparative Ex. 11 | | | | Ex. 12 | | | | Ex. 13 | | | |
| --- | --- | --- | --- | --- | --- | --- | --- | --- | --- | --- | --- | --- | --- | --- | --- | --- |
|  | A | B | C | D | A | B | C | D | A | B | C | D | A | B | C | D |
| Bubble Gum Base | 20.0 | 24.0 | 28.0 | 32.0 | 20.0 | 24.0 | 28.0 | 32.0 | 20.0 | 24.0 | 28.0 | 32.0 | 20.0 | 24.0 | 28.0 | 32.0 |
| Sorbitol | 54.2 | 50.2 | 46.2 | 42.2 | 54.0 | 50.0 | 46.0 | 42.0 | 53.45 | 49.45 | 45.45 | 41.45 | 52.7 | 48.7 | 44.7 | 40.7 |
| Mannitol | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| Lecithin | 0.0 | 0.0 | 0.0 | 0.0 | 0.2 | 0.2 | 0.2 | 0.2 | 0.75 | 0.75 | 0.75 | 0.75 | 1.5 | 1.5 | 1.5 | 1.5 |
| Glycerin | 6.3 | 6.3 | 6.3 | 6.3 | 6.3 | 6.3 | 6.3 | 6.3 | 6.3 | 6.3 | 6.3 | 6.3 | 6.3 | 6.3 | 6.3 | 6.3 |
| Coevaporated Glycerin/Lycasin | 10.01 | 10.01 | 10.01 | 10.01 | 10.01 | 10.01 | 10.01 | 10.01 | 10.01 | 10.01 | 10.01 | 10.01 | 10.01 | 10.01 | 10.01 | 10.01 |
| Peppermint Flavor | 1.45 | 1.45 | 1.45 | 1.45 | 1.45 | 1.45 | 1.45 | 1.45 | 1.45 | 1.45 | 1.45 | 1.45 | 1.45 | 1.45 | 1.45 | 1.45 |

-continued

|  | Comparative Ex. 10 | | | | Comparative Ex. 11 | | | | Ex. 12 | | | | Ex. 13 | | | |
| --- | --- | --- | --- | --- | --- | --- | --- | --- | --- | --- | --- | --- | --- | --- | --- | --- |
|  | A | B | C | D | A | B | C | D | A | B | C | D | A | B | C | D |
| Alitame | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 | 0.04 |

Examples 10A–10D used 0.0% lecithin, Examples 11A–11D used 0.2% lecithin, Examples 12A–12D used 0.75% lecithin and Examples 13A–13D used 1.5% lecithin. All "A" examples (10A, 11A, 12A and 13A) used 20% base; all "B" examples used 24% base; all "C" examples used 28% base; and all "D" examples used 32% base.

Chewout tests were run on all 16 samples and the percentage of Alitame released was calculated. The results are shown in Table 5 below.

TABLE 5

|  | Time, Minutes | | | | |
| --- | --- | --- | --- | --- | --- |
|  | 0 | 1 | 3 | 6 | 18 |
| Example 10A | 0.039 | 77.0 | 89.7 | 94.8 | >98 |
| Example 10B | 0.031 | 71.0 | 87.1 | 96.8 | >98 |
| Example 10C | 0.038 | 73.7 | 84.2 | 92.1 | >98 |
| Example 10D | 0.030 | 63.3 | 80.0 | 90.0 | >98 |
| Example 10 (Average) |  | 71.3 | 85.3 | 93.4 | >98 |
| Example 11A | 0.036 | 66.7 | 83.3 | 91.7 | >98 |
| Example 11B | 0.026 | 65.4 | 80.8 | 88.5 | >98 |
| Example 11C | 0.033 | 57.6 | 78.8 | 84.8 | 97.0 |
| Example 11D | 0.037 | 56.8 | 73.0 | 78.4 | 97.3 |
| Example 11 (Average) |  | 61.6 | 79.0 | 85.8 | 97.6 |
| Example 12A | 0.034 | 55.9 | 64.7 | 70.6 | 82.4 |
| Example 12B | 0.029 | 55.2 | 65.5 | 68.9 | 86.2 |
| Example 12C | 0.032 | 43.7 | 56.3 | 62.5 | 84.4 |
| Example 12D | 0.033 | 42.4 | 63.6 | 63.6 | 84.9 |
| Example 12 (Average) |  | 49.3 | 62.5 | 66.4 | 84.5 |
| Example 13A | 0.039 | 53.8 | 64.1 | 61.5 | 76.9 |
| Example 13B | 0.031 | 38.7 | 51.6 | 54.8 | 77.4 |
| Example 13C | 0.035 | 40.0 | 51.4 | 57.1 | 74.3 |
| Example 13D | 0.030 | 36.6 | 43.3 | 56.6 | 70.0 |
| Example 13 (Average) |  | 42.3 | 52.6 | 57.5 | 74.7 |

Figure 4:
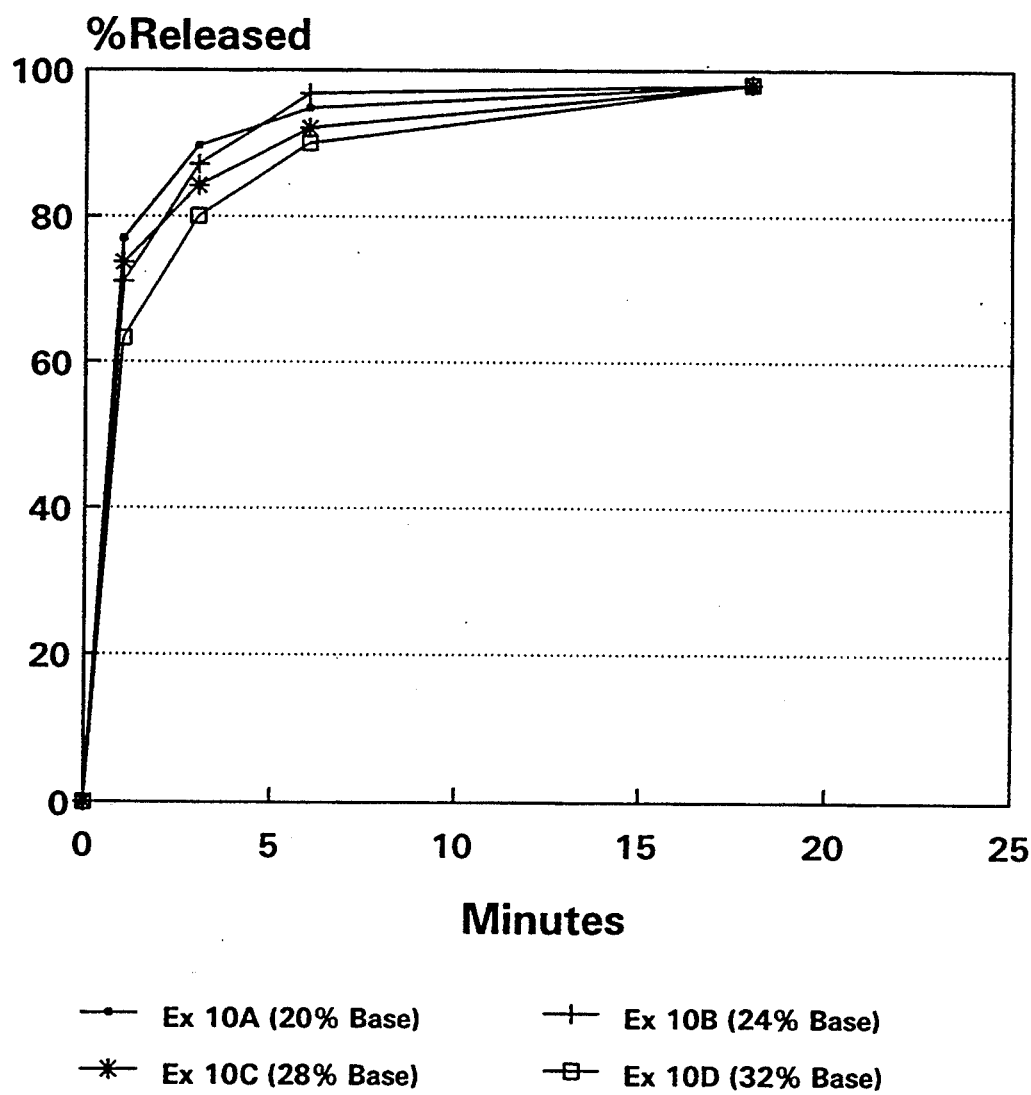
FIG. 4 is a graph showing the Alitame release rates of the gum formulations of comparative Examples 10A, 10B, 10C and 10D, containing different levels of base and no lecithin.
Figure 5:
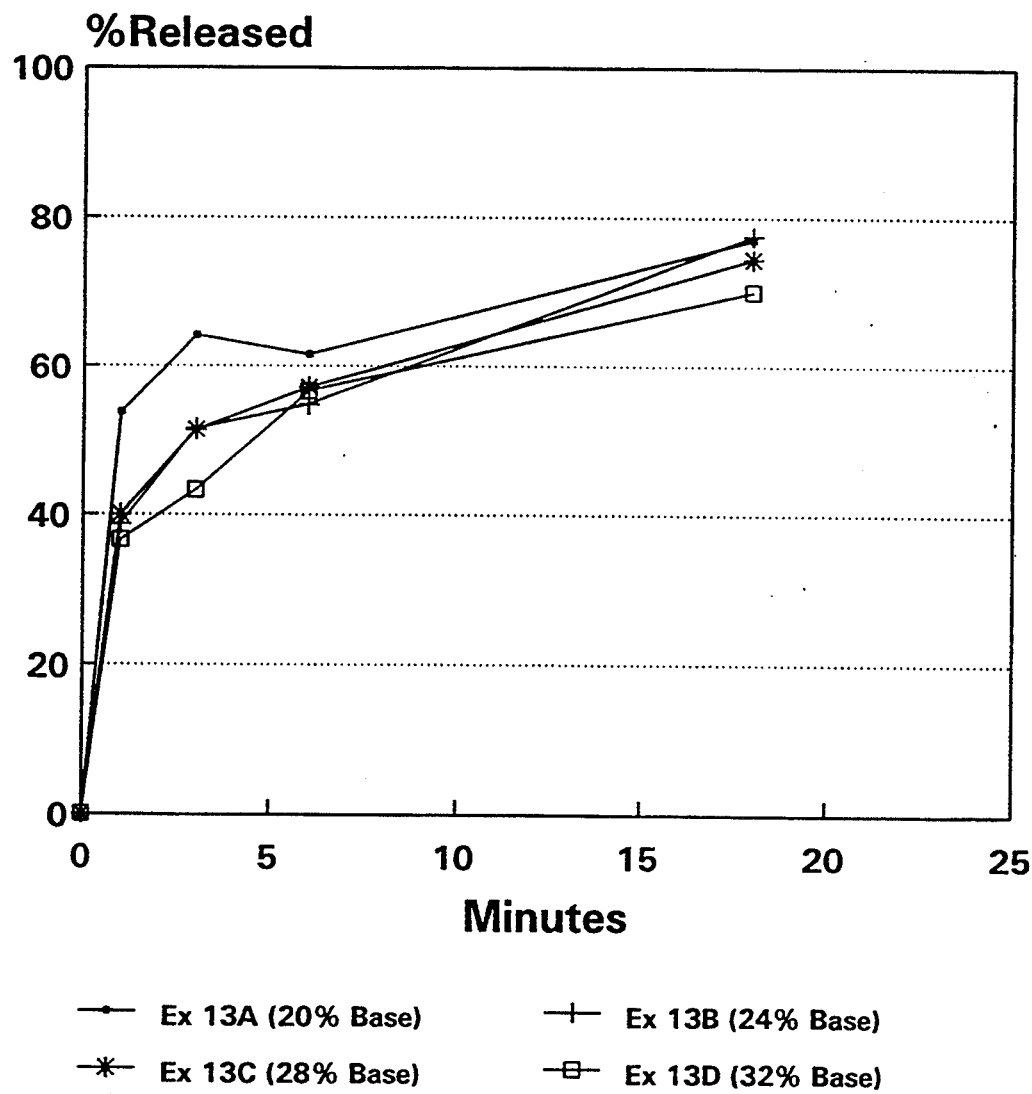
FIG. 5 is a graph showing the Alitame release rates of the gum formulations of Examples 13A, 13B, 13C and 13D, containing different levels of base and 1.5% lecithin.

FIGS. 4 and 5 show the release rate of Alitame at various base levels using 0.0% lecithin (Examples 10A–10D) and 1.5% lecithin (Examples 13A–13D), respectively. The results clearly show virtually no effect on the release rate as a function of the base level. However, a comparison of FIG. 4 with FIG. 5 shows the effect of the differential lecithin levels.

Figure 6:
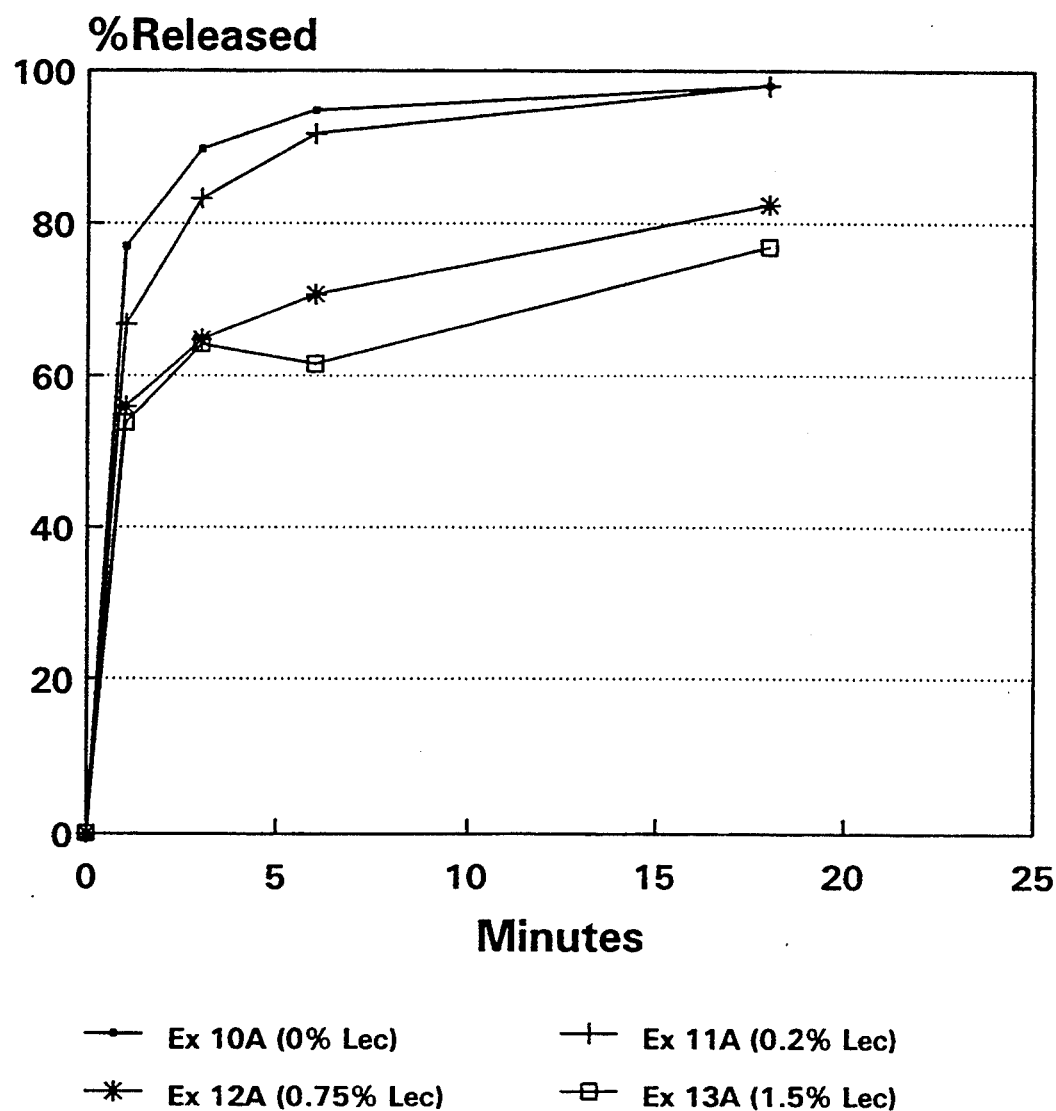
FIG. 6 is a graph showing the Alitame release rates of the gum formulations of comparative Examples 10A and 11A and Examples 12A and 13A, all having 20% base and different levels of lecithin.
Figure 7:
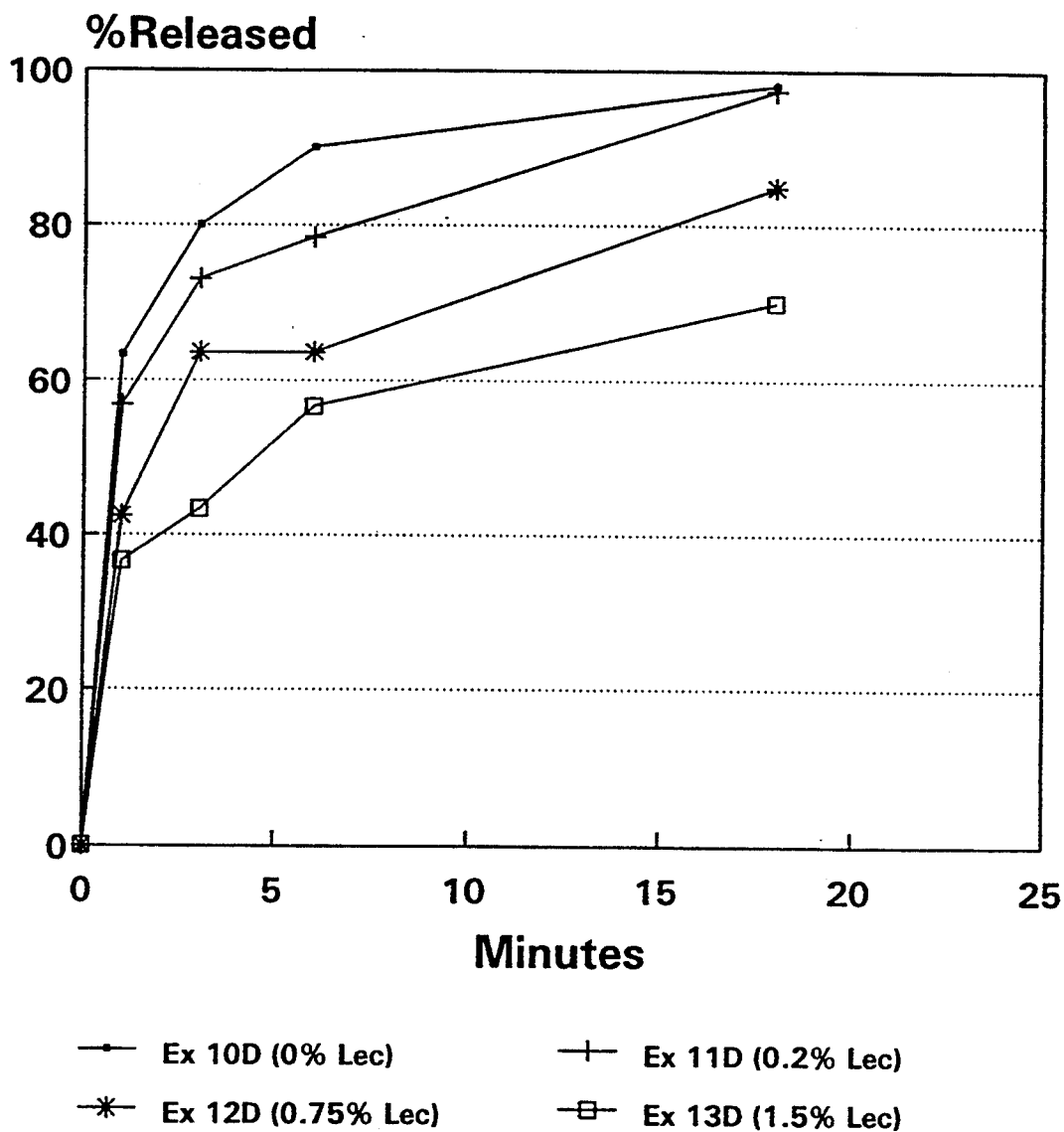
FIG. 7 is a graph showing the Alitame release rates of the gum formulations of comparative Examples 10D and 11D and Examples 12D and 13D, having 32% base and different levels of lecithin.
Figure 8:
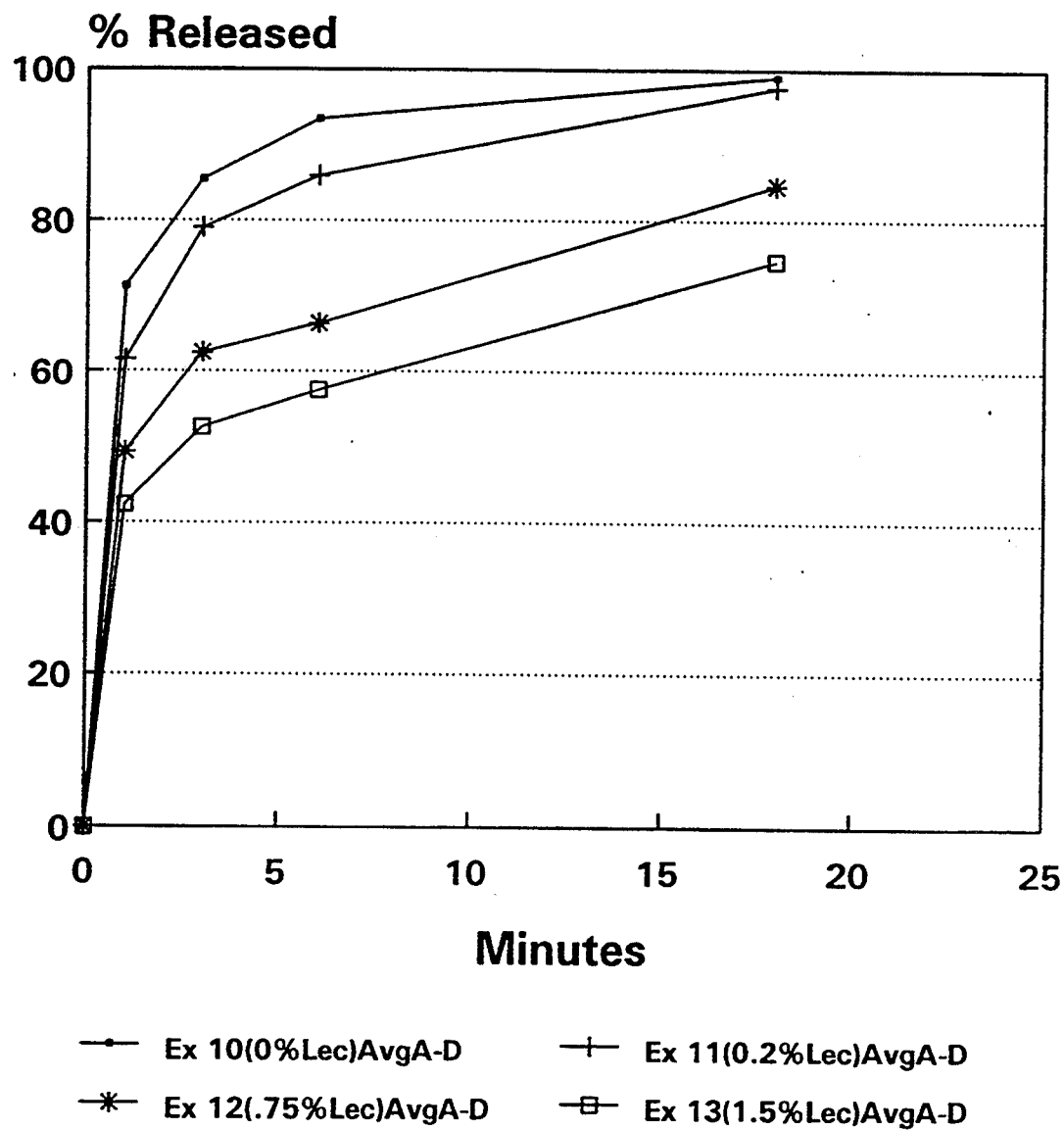
FIG. 8 is a graph showing the average Alitame release rates of the gum formulas of comparative Examples 10 and 11 and Examples 12 and 13, averaging the release rates for gums with the same level of lecithin but different levels of base.

In FIGS. 6 and 7, the Alitame release rate of formulations with various levels of lecithin at 20% base and 32% base, respectively, are shown. At both base levels, the graphs clearly show that an increased lecithin level slows the Alitame release rate. In FIG. 8, the release rates are averaged to show the effect of lecithin. Examples 10 and 11 have similar, fast release rates, and are therefore listed as Comparative Examples. Examples 12 and 13, with 0.75% and 1.5% lecithin, respectively, have slower release rates.

Tables 6A–D below show the differences in percentage release rates over the first six minutes of chewing for Examples A–D respectively between Comparative Example 10 (with no lecithin) and Examples 11 (having 0.2% lecithin), 12 (having 0.75% lecithin) and 13 (having 1.5% lecithin).

TABLE 6A

Difference in Release Rate Compared to Comparative Example 10A

|  | Time/Minutes | | |
| --- | --- | --- | --- |
| Example | 1 | 3 | 6 |
| Comparative |  |  |  |
| 11A | 10.3 | 6.4 | 3.1 |
| 12A | 21.1 | 25.0 | 24.2 |
| 13A | 23.2 | 25.6 | 33.3 |

TABLE 6B

Difference in Release Rate Compared to Comparative Example 10B

|  | Time/Minutes | | |
| --- | --- | --- | --- |
| Example | 1 | 3 | 6 |
| Comparative |  |  |  |
| 11B | 5.6 | 6.3 | 8.3 |
| 12B | 15.8 | 21.6 | 27.9 |
| 13B | 32.3 | 35.5 | 42.0 |

TABLE 6C

Difference in Release Rate Compared to Comparative Example 10C

|  | Time/Minutes | | |
| --- | --- | --- | --- |
| Example | 1 | 3 | 6 |
| Comparative |  |  |  |
| 11C | 16.1 | 5.4 | 7.3 |
| 12C | 30.0 | 27.9 | 29.6 |
| 13C | 33.7 | 32.8 | 35.0 |

TABLE 6D

Difference in Release Rate Compared to Comparative Example 10D

|  | Time/Minutes | | |
| --- | --- | --- | --- |
| Example | 1 | 3 | 6 |
| Comparative |  |  |  |
| 11D | 6.5 | 7.0 | 11.6 |
| 12D | 20.9 | 16.4 | 26.4 |
| 13D | 26.7 | 36.7 | 33.4 |

Tables 7A–D are like Table 4, but they give the percentage decrease in release rate compared to the release rate respectively of samples A–D of Comparative Example 10.

TABLE 7A

Percentage Decrease in Release Rate Compared to Comparative Example 10A

|  | Time/Minutes | | |
| --- | --- | --- | --- |
| Example | 1 | 3 | 6 |
| Comparative |  |  |  |
| 11A | 13.4 | 7.1 | 3.3 |
| 12A | 27.4 | 27.9 | 25.5 |
| 13A | 30.1 | 28.5 | 35.1 |

TABLE 7B

Percentage Decrease in Release Rate
Compared to Comparative Example 10B

| Example | Time/Minutes | | |
|---|---|---|---|
| | 1 | 3 | 6 |
| Comparative | | | |
| 11B | 7.9 | 7.2 | 8.6 |
| 12B | 22.3 | 24.8 | 28.8 |
| 13B | 45.5 | 40.8 | 43.4 |

TABLE 7C

Percentage Decrease in Release Rate
Compared to Comparative Example 10C

| Example | Time/Minutes | | |
|---|---|---|---|
| | 1 | 3 | 6 |
| Comparative | | | |
| 11C | 21.8 | 6.4 | 7.9 |
| 12C | 40.7 | 33.1 | 32.1 |
| 13C | 45.7 | 39.0 | 38.0 |

TABLE 7D

Percentage Decrease in Release Rate
Compared to Comparative Example 10D

| Example | Time/Minutes | | |
|---|---|---|---|
| | 1 | 3 | 6 |
| Comparative | | | |
| 11D | 10.3 | 8.8 | 12.9 |
| 12D | 33.0 | 20.5 | 29.0 |
| 13D | 42.2 | 45.9 | 37.1 |

Figure 9:
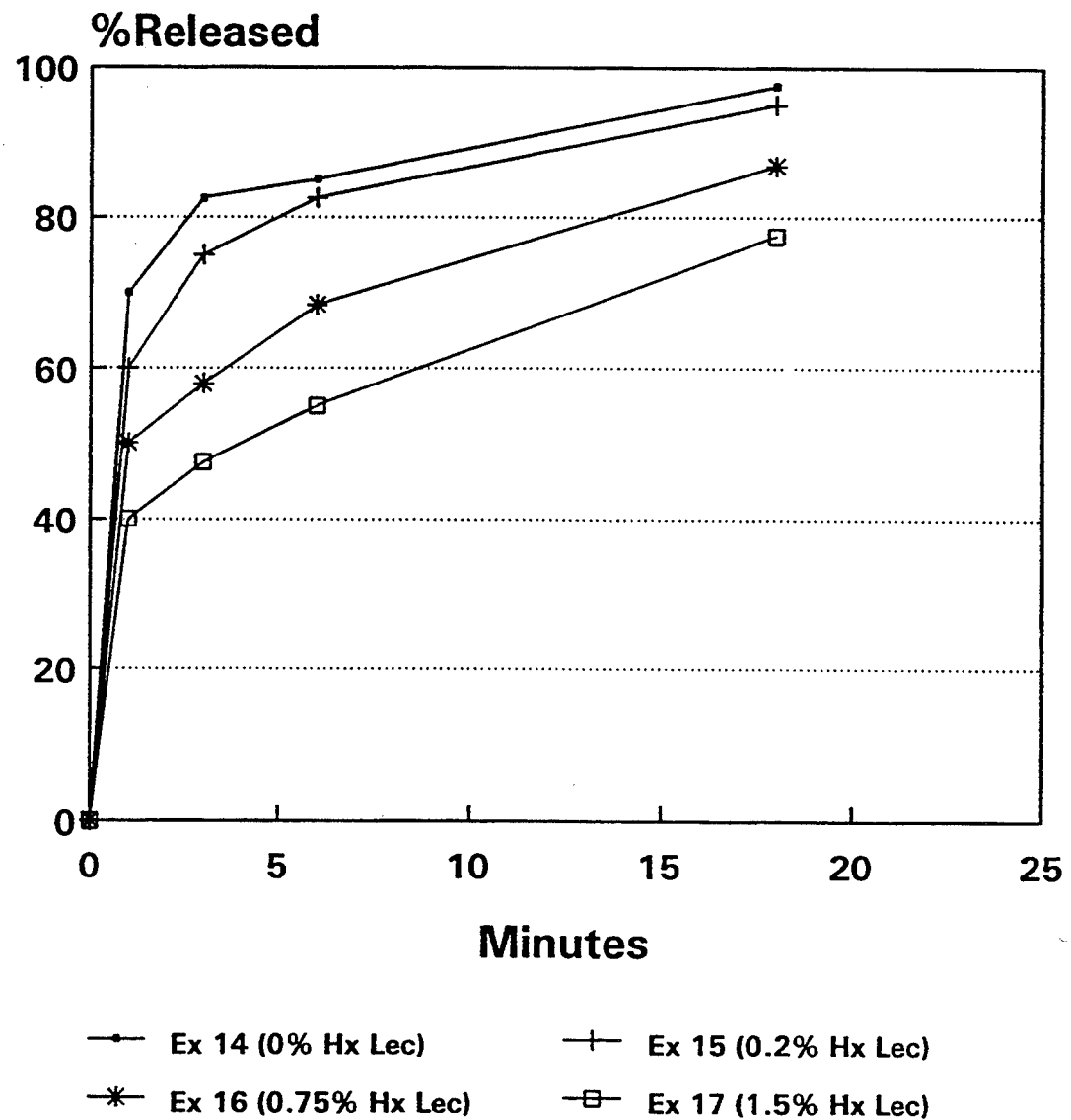
FIG. 9 is a graph showing the Alitame release rates of the gum formulations of comparative Examples 14 and 15 and Examples 16 and 17, containing different levels of hydroxylated lecithin.

In all of the above Examples 1-13, the lecithin was Central 3F from Central Soya, Co., Inc. That lecithin is provided in a solution with soybean oil, is about 64% active phospholipids and has an HLB of about 4. Another type of lecithin, Centrolene S, hydroxylated lecithin, from Central Soya Co., Inc. was tested in Examples 14-17 below. Hydroxylated lecithin has an HLB of about 9 and is also dissolved in soybean oil. Examples 14-17 are made identical to Examples 10D, 11D, 12D and 13D respectively, except that hydroxylated lecithin was used in place of regular lecithin. Chewout tests were run for 1, 3, 6 and 18 minutes. The data from that test is shown below in Table 8 and graphically in FIG. 9.

TABLE 8

| | Time, Minutes | | | | |
|---|---|---|---|---|---|
| | 0 | 1 | 3 | 6 | 18 |
| Example 14 | 0.040 | 70.0 | 82.5 | 85.0 | 97.5 |
| Example 15 | 0.040 | 60.0 | 75.0 | 82.5 | 95.0 |
| Example 16 | 0.038 | 50.0 | 57.9 | 68.4 | 86.8 |
| Example 17 | 0.040 | 40.0 | 47.5 | 55.0 | 77.5 |

Based on this data, Examples 14 and 15 were designated comparative Examples. Tables 19 and 10 give, respectively, the difference in release rate and the percentage difference in release rate comparing the release rates of comparative Example 15 and Examples 16 and 17 compared to comparative Example 14, similar to Tables 3 and 4 above.

TABLE 9

Differences in Release Rate
Compared to Comparative Example 14

| | Time, Minutes | | | |
|---|---|---|---|---|
| | 1 | 3 | 6 | 18 |
| Comparative Example 15 | 10.0 | 7.5 | 2.5 | 2.5 |
| Example 16 | 20.0 | 24.6 | 16.6 | 10.7 |
| Example 17 | 30.0 | 35.0 | 30.0 | 20.0 |

TABLE 10

Percentage Decrease in Release Rate
Compared to Comparative Example 14

| | Time, Minutes | | | |
|---|---|---|---|---|
| | 1 | 3 | 6 | 18 |
| Comparative Example 15 | 14.3 | 9.1 | 2.9 | 2.6 |
| Example 16 | 28.6 | 29.8 | 19.4 | 11.0 |
| Example 17 | 57.1 | 42.4 | 35.3 | 20.5 |

These results show that hydroxylated lecithin at levels of 0.75% and 1.5% also delayed the release of Alitame by more than 15% during the first to sixth minutes of chewing.

EXAMPLES 18-21

In U.S. Pat. No. 5,041,293, a method of adding lecithin to a chewing gum is disclosed. A sample of the water/lecithin/mannitol blend described in Example B of U.S. Pat. No. 5,041,293 was prepared. The lecithin used to make the lecithin/mannitol blend was Centrolex R from Central Soya, which is a powdered lecithin and is more concentrated than the liquid lecithin used in the earlier examples. Centrolex R is about 95% active phospholipids. After the blend was made and dried, the blend contained 25 parts concentrated lecithin and 100 parts mannitol, or 20% concentrated lecithin. The following Examples 18, 19, 20, and 21 use the lecithin/mannitol blend at levels which correspond to 0, 0.2%, 0.75%, and 1.5% concentrated lecithin in the following compositions:

| | Ex. 18 | Ex. 19 | Ex. 20 | Ex. 21 |
|---|---|---|---|---|
| Bubble Gum Base | 32.0 | 32.0 | 32.0 | 32.0 |
| Sorbitol | 42.2 | 42.0 | 41.45 | 40.7 |
| Mannitol | 8.0 | 7.2 | 5.0 | 2.0 |
| Lecithin/Mannitol Blend | 0.0 | 1.0 | 3.75 | 7.5 |
| Glycerin | 6.3 | 6.3 | 6.3 | 6.3 |
| Coevaporated Glycerin/Lycasin | 10.01 | 10.01 | 10.01 | 10.01 |
| Peppermint Flavor | 1.45 | 1.45 | 1.45 | 1.45 |
| Alitame | 0.04 | 0.04 | 0.04 | 0.04 |

Figure 10:
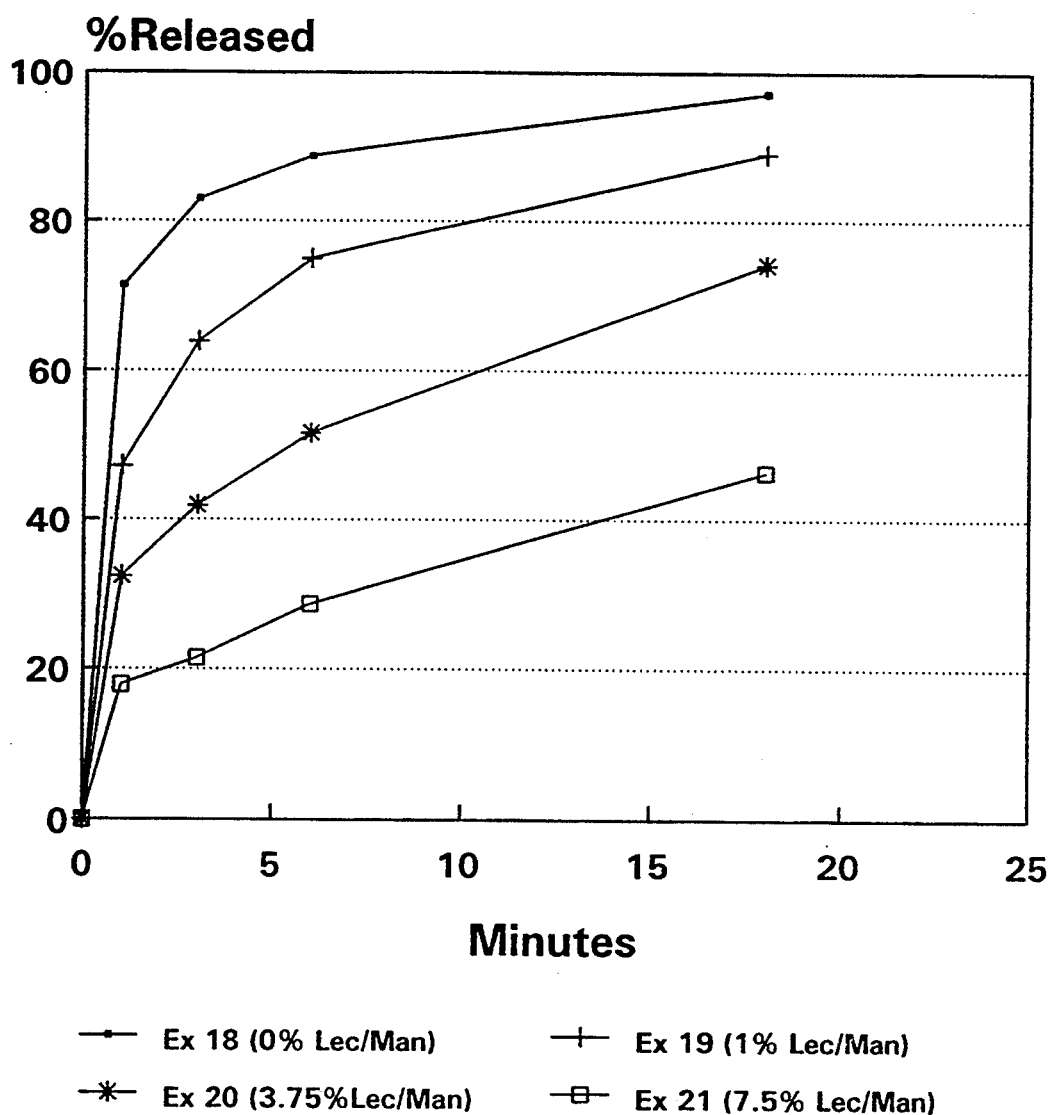
FIG. 10 is a graph showing the Alitame release rates of the gum formulations of comparative Example 18 and Examples 19-21, containing different levels of a blend of lecithin and mannitol.

Chewout tests were run for 1, 3, 6, and 18 minutes. The data from that test is shown below in Table 11 and graphically in FIG. 10.

TABLE 11

| | Time, Minutes | | | | |
|---|---|---|---|---|---|
| | 0 | 1 | 3 | 6 | 18 |
| Example 18 | 0.035 | 71.4 | 82.9 | 88.6 | 97.1 |
| Example 19 | 0.036 | 47.2 | 63.9 | 75.0 | 88.9 |
| Example 20 | 0.031 | 32.3 | 41.9 | 51.6 | 74.2 |
| Example 21 | 0.028 | 17.9 | 21.4 | 28.6 | 46.4 |

Tables 12 and 13 give, respectively, the difference in release rate and the percentage difference in release rate comparing the release rates of Examples 19, 20 and 21 compared to comparative Example 18, similar to Tables 3 and 4 above.

TABLE 12

Difference in Release Rate Compared to Comparative Example 18

| | Time, Minutes | | | |
|---|---|---|---|---|
| | 1 | 3 | 6 | 18 |
| Example 19 | 24.2 | 19.0 | 13.6 | 8.2 |
| Example 20 | 39.1 | 41.0 | 37.0 | 22.9 |
| Example 21 | 53.5 | 61.5 | 60.0 | 50.7 |

TABLE 13

Percentage Decrease in Release Rate Compared to Comparative Example 18

| | Time, Minutes | | | |
|---|---|---|---|---|
| | 1 | 3 | 6 | 18 |
| Example 19 | 33.9 | 22.9 | 15.3 | 8.4 |
| Example 20 | 54.8 | 49.5 | 41.8 | 23.6 |
| Example 21 | 74.9 | 74.2 | 67.7 | 52.2 |

As seen from the above, in each of the Examples 19–21, the lecithin was effective in delaying the Alitame release rate such that after six minutes of chewing, at least 25% of the Alitame in the gum had yet to be released. Also, compared to Example 18 that contained no lecithin, there was at least a 15% decrease in the Alitame release rate during the first through sixth minutes of chewing. Hence, when a concentrated form of lecithin is used, 0.2% lecithin was found to be effective in this gum formulation.

The results of these numerous tests indicate that lecithin may be added in any manner to effect the release rate of Alitame. Lecithin may also be added to the gum base at sufficiently high levels to effect the release rate of Alitame. (All of the comparative and inventive examples used a gum base that did not contain lecithin.)

From these results it is seen that a high amount of lecithin in the gum composition delays the release of Alitame formulated into the gum. This is an unexpected result since one would normally think that lecithin would not have any effect on the release of non-lipophilic gum ingredients such as Alitame.

An effective amount of lecithin will preferable delay the Alitame release such that there is at least a 15% decrease in the Alitame release rate during the first through sixth minutes of chewing, compared to the release rate of the same formulation without the lecithin. The lecithin is preferably present in an amount effective such that after six minutes of chewing, at least 25% of the Alitame originally in the gum has yet to be released. Normally this will require the use of at least 0.4% lecithin by weight of the gum composition. A more preferred range of lecithin is between about 0.5% and about 3%. The lecithin is most preferably incorporated at a level of between about 0.6% and about 1.5% of the gum composition. These values are for lecithin in its normal form, and may be reduced when lecithin is used in a concentrated form.

The unique effect of delayed release of Alitame appears to be due to the specific combination of lecithin and Alitame. This effect may be due to physical reaction or bonding of these two ingredients together. This combination may also offer unique benefits in other types of confectionery products in which lecithin is used and in which Alitame may be used in the future as a high intensity sweetener. The combination of lecithin and Alitame in confections like taffy, caramel, or chocolate may offer modified sweetness attributes, improved Alitame or product stability, or other benefits.

Lecithin may also be added to Alitame that has been modified by encapsulation, agglomeration or entrapment. Alitame encapsulated with other ingredients may be produced with the addition of lecithin, and this may give further delayed release effects where controlled release encapsulation is done. This would include the various methods of Alitame modification where bulking agents are used, all types of encapsulation, and many agglomeration agents, as disclosed in PCT Publication WO 90/06061. Lecithin may also be added to combinations of high intensity sweeteners and Alitame which are then used to make gum.

In Examples 1–17, the lecithin was provided in its common liquid form, in which the lecithin is dissolved in a vegetable oil such as soybean oil. In Examples 18–21, the lecithin was mixed with another gum ingredient, such as the bulking agent mannitol, as in U.S. Pat. No. 5,041,293. However, this invention is not limited to these methods of addition of lecithin to chewing gum. Lecithin may be added as a powder, granule or solution in oil, or aqueous dispersion. Lecithin may also be added to gum with the flavor, as in U.S. Pat. No. 4,604,288, or added in an emulsion as in U.S. Pat. No. 4,786,491. Lecithin may also be added to chewing gum as a hydrated lecithin, as in U.S. Pat. No. 4,904,482. The lecithin may be added as part of a system that uses the lecithin as an emulsifier for the system, such as the sweetener delivery systems disclosed in U.S. Pat. Nos. 4,816,265; 5,064,658 and 5,126,151.

The Alitame is preferably incorporated into the gum at a level of between about 0.01% and about 0.2%, and most preferably between about 0.02% and about 0.05%. The Alitame may be added as a powder, as in the Examples, or in solution with an aqueous liquid or other solvent. Alitame may also be added to chewing gum in a form in which it is encapsulated, agglomerated, or entrapped for use as a controlled release sweetener.

The remainder of the chewing gum ingredients are noncritical to the present invention. That is, the Alitame and lecithin can be incorporated into conventional chewing gum formulations in a conventional manner. Naturally, the preferred chewing gum formulation is a sugarless chewing gum. However, the invention may also be used in a sugar chewing gum where the Alitame is used to intensify and/or extend the sweetness thereof. The invention may be used in either regular chewing gum or bubble gum.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

I claim:

1. A chewing gum composition comprising:
   a) about 5% to about 95% gum base,
   b) about 10% to about 90% bulking agent,
   c) a sweetening amount of Alitame and d) lecithin in an amount effective to delay the release of the Alitame, whereby at least a 15% decrease in the Alitame release rate between the first and sixth minutes of chewing, compared to the same formula without the lecithin, is achieved.

2. The chewing gum composition of claim 1 wherein the lecithin is present at a level of at least 0.4% of the gum.

3. The chewing gum composition of claim 1 wherein the lecithin is present at a level of between about 0.5% and about 3%.

4. The chewing gum composition of claim 1 wherein the lecithin is present at a level of between about 0.6% and about 1.5%.

5. A chewing gum composition comprising:
a) about 5% to about 95% gum base,
b) about 10% to about 90% bulking agent,
c) an original amount of Alitame, and
d) lecithin in an amount effective such that after six minutes of chewing, at least 25% of the original amount of Alitame has yet to be released from the gum.

6. The chewing gum composition of claim 5 wherein the Alitame is formulated at between about 0.01% and about 0.2% of the gum composition.

7. The chewing gum composition of claim 5 wherein the lecithin is present at a level of at least 0.4% of the gum.

8. A process for delaying the release of Alitame from a gum composition comprising formulating a gum composition comprising from about 5% to about 95% gum base, about 10% to about 90% bulking agent and a sweetening amount of Alitame and admixing into the gum composition an amount of lecithin to delay the Alitame release such that after six minutes of chewing, at least 25% of the original amount of Alitame has yet to be released from the gum composition.

9. The process of claim 8 wherein the lecithin is in the form of a liquid when it is admixed into the gum composition.

10. The process of claim 9 wherein the lecithin is dissolved in vegetable oil.

11. The process of claim 8 wherein the lecithin is added in a powdered, concentrated form.

12. The process of claim 8 wherein the lecithin is preblended with another chewing gum ingredient and then added to the gum composition.

13. A process for making a chewing gum composition having a delayed release of Alitame sweetener comprising the steps of:
a) providing a gum base at a level of about 5% to about 95% of the gum composition,
b) providing a bulking agent at a level of about 10% to about 90% of the gum composition,
c) providing an Alitame sweetening agent at a level of about 0.01% to about 0.2% of the gum composition,
d) providing lecithin at a level of at least about 0.4% of the gum composition, and
e) mixing the gum base, bulking agent, Alitame sweetening agent and lecithin to make a chewing gum composition.

14. The process of claim 13 wherein the lecithin is in the form of a liquid when it is admixed into the gum composition.

15. The process of claim 14 wherein the lecithin is dissolved in vegetable oil.

16. The process of claim 13 wherein the lecithin is provided at a level of between about 0.5% and about 3% of the gum composition.

17. The process of claim 13 wherein the lecithin is provided at a level of between about 0.6% and about 1.5% of the gum composition.

18. The process of claim 13 wherein the lecithin comprises hydroxylated lecithin.

19. The process of claim 13 wherein the lecithin is hydrated prior to being mixed with the gum base.

* * * * *

UNITED STATES PATENT AND TRADEMARK OFFICE
CERTIFICATE OF CORRECTION

PATENT NO. : 5,334,396
DATED : August 2, 1994
INVENTOR(S) : Yatka et al.

It is certified that error appears in the above-identified patent and that said Letters Patent is hereby corrected as shown below:

In column 9, line 52, replace "differential" with --different--.

In column 11, line 37, replace "Soya, Co.," with --Soya Co.,--.

In column 11, line 62, replace "19" with --9--.

Signed and Sealed this

Eighth Day of August, 2000

Attest:

Q. TODD DICKINSON

*Attesting Officer*　　　*Director of Patents and Trademarks*